Oct. 11, 1966  W. W. HUMES  3,278,289
PIVOTED GLASS SHEET BENDING MOLD

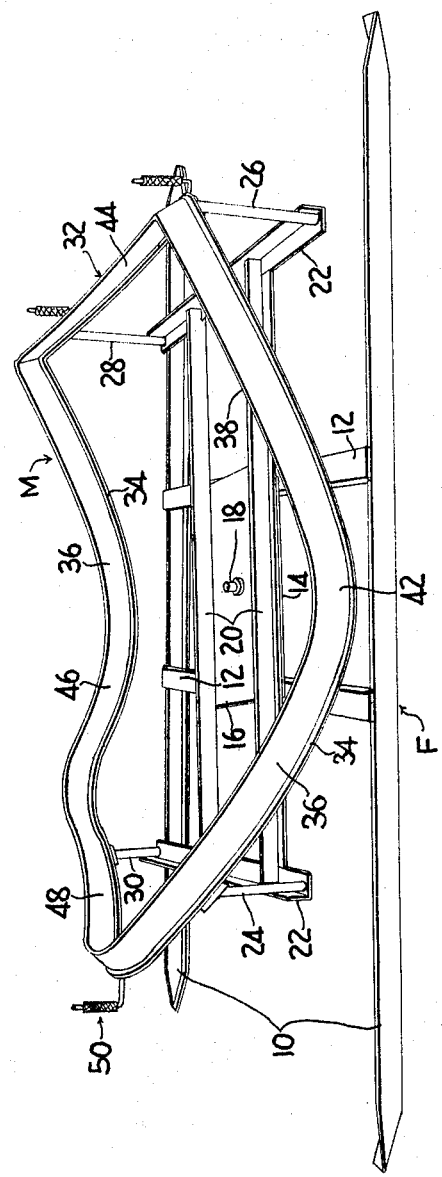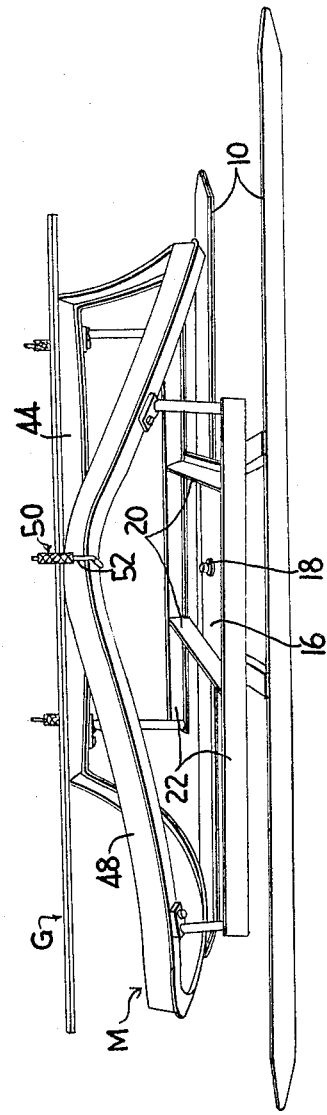

Filed Nov. 14, 1962  3 Sheets-Sheet 2

INVENTOR.
WALTER W. HUMES
BY
Oscar L. Spencer
ATTORNEY

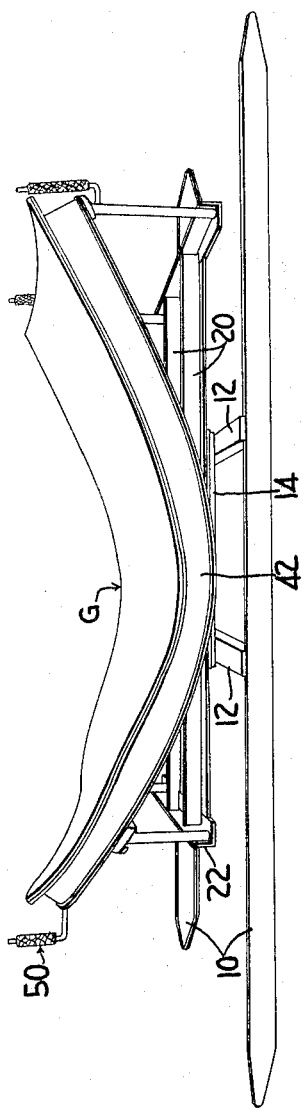
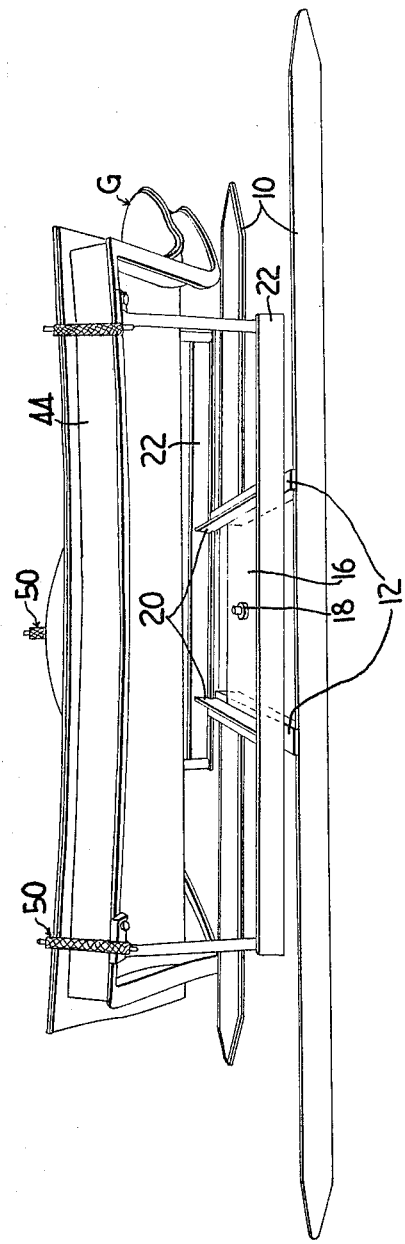

United States Patent Office 3,278,289
Patented Oct. 11, 1966

3,278,289
PIVOTED GLASS SHEET BENDING MOLD
Walter W. Humes, Natrona Heights, Pa., assignor to Pittsburgh Plate Glass Company, Pittsburgh, Pa., a corporation of Pennsylvania
Filed Nov. 14, 1962, Ser. No. 237,619
4 Claims. (Cl. 65—287)

This invention relates to bending glass sheets and is particularly useful in bending glass sheets to compound curvatures in which the glass sheets are bent about axes extending both longitudinally and transversely thereof, particularly to curves of non-uniform radii of curvature. The present invention represents an improvement in glass sheet bending techniques involving exposing the glass while supported in bending relation to a shaping surface to a non-uniform elevated temperature pattern which causes different portions of the glass sheets undergoing bending to heat-soften at different rates into conformity with the shaping surface.

According to the present invention, the glass sheet is first oriented in one direction relative to a non-uniform temperature or heating pattern designed to promote a non-uniform softening of the glass sheet with respect to one bending axis, and before the bend is completed, the entire glass sheet is rotated about an axis intersecting the glass sheet in a direction substantially normal to its initial plane of support so that it is oriented at an angle to its original orientation in order to heat-sag the glass sheet into conformity with a desired curvature transverse to the bend in the first direction. The glass sheet is maintained in bending relation to the shaping surface when its orientation is changed with respect to the temperature pattern.

The present invention also provides novel glass sheet bending apparatus including a bending mold pivotally mounted on a supporting frame to rotate about an axis that intersects a glass sheet while supported in bending relation to said bending mold. The latter comprises spaced, elongated, parallel runners and members interconnecting the runners to a bearing plate. Means for mounting the bending mold in pivotal relation to the supporting frame comprises a vertically extending pivot rod and a bearing plate attached to the outline shaping surface of the bending mold so as to permit the mold to be oriented in any desired angular relation with respect to the supporting frame during the bending operation.

Many factors make it difficult to bend glass sheets to non-uniform shapes along two different axes. The glass sheet thickness may vary. The thermal output in the bending furnace may vary due to variation in voltage or burn-outs of electrical elements where electric heaters are employed, and due to variations in richness of gas or gas pressure when gas burners are employed. Also, old equipment is used for specialty bends of this type which are not required in sufficiently large quantities to require automatic mass-production furnaces. Hence, the present invention is most suitable for employment in fabricating specialty bends of a low production requirement where individual control of each bend is important. It is understood, however, that the present construction of mold may also be employed in automated operations if and when the specialty bends such as depicted herein are required in larger quantities.

The construction of the mold according to the present invention enables operators to rotate the mold with respect to the mold supporting frame to observe the bend along the four sides of the outline shaping surface. The present construction permits the operators to adjust the orientation of the glass bending mold and its supported glass sheet with respect to the heating pattern within the tunnel-like lehr during bending, thereby controlling the rate of sag along both the longitudinal and transverse dimension of the glass sheets as needed.

The present invention will be understood more clearly after a study of the description of a preferred illustrative embodiment thereof particularly useful to bend glass sheets having generally quadrilateral shapes into complicated compound curvatures prior to their lamination with polyvinyl butyral sheets reinforced with metal frames to serve as aircraft glazing closures.

In the drawings which form part of the description of the present invention and wherein like reference numbers are applied to like structural elements, FIG. 1 is a perspective view of an outline bending mold pivotally supported on a mold support frame according to the teachings of the present invention;

FIG. 2 is a side view in perspective of a mold loaded with a flat glass sheet oriented for accomplishing a relatively sharp bend about an axis transverse to its longitudinal dimension;

FIG. 5 is a side view of the mold in perspective with the mold pivoted into proper orientation for accomplishment of a second bend about an axis extending longitudinally of the glass;

FIG. 6 is a perspective side view of the mold showing the transverse dimension of the glass sheet in contact with the shaping surface after the compound bend has been completed.

Figure 3:
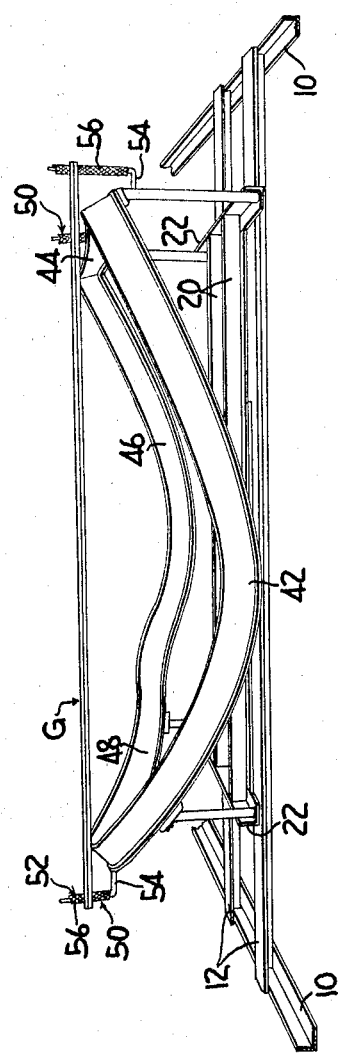
FIG. 3 is an end view in perspective transverse to the view of FIG. 2 showing a relatively gentle transverse bending component of the compound bend desired.
Figure 4:
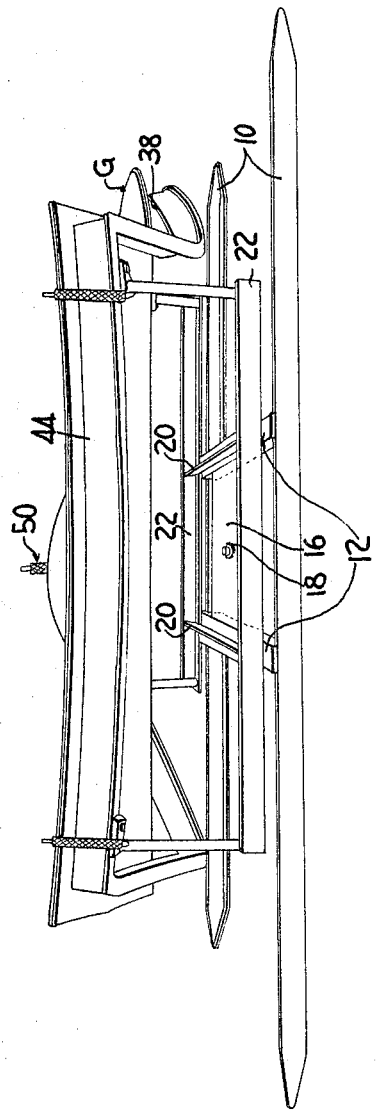
FIG. 4 is a side view in perspective of the mold showing the first bend partially completed and the glass prepared for a change in orientation with respect to the lehr heating pattern to produce the second bend about an axis angularly disposed with respect to the first axis of bending and after which exposure the glass sheets sags into contact with the entire outline shaping surface.

With reference to the drawings, F refers to a mold support frame and M to an outline mold pivotally supported thereon in the novel manner provided by the present invention. The frame F comprises a pair of runners 10 extending parallel to one another in spaced relation therebetween. The runners are preferably angle irons adapted to have the undersurface of their horizontal members ride over a series of conveyor rolls in a furnace. In order to maintain the runners in spaced relation with respect to one another, cross bars 12 interconnect each of the runners 10 to one another and also support a bearing plate 14.

The mold M comprises a bearing plate 16 pivotally connected with respect to the first bearing plate 14 by means of a vertically extending pivot rod 18. Elements 14, 16, and 18 comprise means pivotally mounting the mold M to the mold supporting frame F about an axis extending at an angle and preferably normal to the general plane of the shaping surface of the mold M. A pair of parallel additional angle irons 20 are attached to the upper surface of the plate 16 and extend therebeyond. To the ends of angle irons 20 are welded additional parallel horizontal angle irons 22 extending normal thereto.

Posts 24, 26, 28, and 30 are attached to the extremities of each of the additional horizontal parallel angle irons 22 and extend upward therefrom to support an outline mold of stainless steel depicted generally as M.

The outline stainless steel mold M includes a shaping rail 32 of inverted T-section comprising a horizontal rail member 34 with its width disposed generally horizontally attached to the bottom edge of a rail 36 extending lengthwise around the perimeter of the shaping surface with its width oriented vertically. The upper edge surface 38 of rail 36 is shaped to provide the outline shaping surface of the mold M. The latter conforms to the shape desired for the peripheral portion of the glass sheet after bending.

The outline stainless steel rail 32 has its horizontal member 34 attached rigidly to the uppermost portions of vertical posts 24, 26, 28, and 30.

The outline rail 32 comprises four side rail portions 42, 44, 46, and 48. The first and third sides 42 and 46, respectively, extend generally longitudinally of the quadrilateral outline shaping surface and are provided with relatively sharply bent upper shaping surfaces. The second side rail portion 44 and the fourth side rail portion 48 extend along the generally transverse dimension of the shaping surface rail and present comparatively shallow upper shaping surface portions conforming to the curvature desired along the transverse edge portions of the bent glass sheet. The pivot rod 18 is located below and within an area subtended by the outline rail 32.

Locator members 50, each comprising a pin 52 having a horizontally outwardly extending portion 54 extending outwardly from its point of attachment to horizontal member 34 and a ceramic sleeve 56 surrounding a vertical extension of pin 52 are located near the longitudinal extremities of the mold to guide an operator into the proper alignment of the glass sheet on the shaping surface.

The operation of the mold is as follows:

The mold is first oriented in the manner depicted in FIGURES 2 and 3 and a pair of flat glass sheets G which have been previously cut to the desired ultimate outline of the bent glass sheet are mounted on the mold. The runners 10 rest on conveyor rolls and are conveyed through a tunnel-like lehr having a series of windows and openings permitting operators to obtain access to the mold by means of poles.

The glass-laden mold is exposed to a non-uniform temperature pattern for a time sufficient to soften the glass sheet non-uniformly so that the glass sheet sags in substantial conformity with the upper shaping surfaces of side rail portions 42 and 46. Operators are able to view the progress of the first bend through a series of windows along the side walls of the tunnel-like bending lehr. When the first bend of the glass sheet has progressed sufficiently, an operator inserts a tool such as a window pole to engage one of the vertical posts 24, 26, 28, or 30 to rotate the mold M with respect to the supporting frame about pivot rod 18 and present the sharply bent glass sheet into an orientation with respect to the heating pattern provided within the bending lehr so as to cause the second portion of the compound bend to be accomplished about an axis angularly disposed with respect to the first axis of bending. The glass sheet sags to contact upper shaping surface 38 of all four rail portions 42, 44, 46, and 48.

FIGURE 6 shows the glass sheets resting on the mold shaping surface after completion of the compound bend. The numerous windows along the furnace walls permit the observers to keep tabs on the progress of bending.

A high speed motor is operatively connected to the rolls of the last portion of the conveyor in order to accelerate the removal of completely bent glass sheets if desired. A push button actuates the high speed rotation of the rolls of the last portion of the conveyor when depressed in a manner well known in the art. This manual control of the duration of heating is especially important in bending specialty patterns in such small quantities that it is not economically feasible to spend the time needed for the lehr temperature pattern to stabilize.

Manual control by push button means operating a high speed run-out enables the operators to vary the duration of the heating cycle from between about 20 minutes to about 30 minutes at about 1250 degrees Fahrenheit in a typical commercial operation for bending sheets of ¼ inch thickness of a soda-lime-silica plate glass composition consisting essentially of 70–72 percent $SiO_2$, 12.5 to 13.5 percent $Na_2O$, 9.5 to 12 percent $CaO$, 2 to 4.5 percent $MgO$, 0.4 to 0.7 percent $Na_2SO_4$, about 0.1 to 0.15 percent $NaCl$, 0.1 to 0.6 percent $Fe_2O_3$, and 0.1 to 0.9 percent $Al_2O_3$ by weight.

The form of the invention shown and described herein represents an illustrative preferred embodiment thereof. It is understood that various changes may be made, such as employing a cave-like furnace rather than a tunnel-like structure or pivoting the mold and treated glass to any angle whatsoever or for inspection purposes only, or employing a sectionalized mold rather than a continuous mold, for example, without departing from the spirit of the invention as defined in the claimed subject matter which follows.

What is claimed is:

1. Apparatus for bending glass sheets comprising a support frame, a bending mold having an outline shaping surface formed thereon and means located below said bending mold and within an area subtended by said outline shaping surface for supporting said bending mold above said support frame in pivotal relation thereto for pivoting said mold relative to said frame about an axis extending substantially normal to said shaping surface and intersecting a glass sheet while the latter is supported in bending relation to said outline shaping surface.

2. Apparatus for bending glass sheets comprising a skeleton support frame including a pair of spaced runners, an outline type glass sheet bending mold having an upper shaping surface conforming to the shape desired for a glass sheet after bending, said outline defining a generally quadrilateral shape, and means located below said bending mold and within an area subtended by the outline of its shaping surface for supporting said mold above said support frame in pivotal relation thereto for pivoting said mold relative to said frame about an axis intersecting a glass sheet while the latter is supported in bending relation to said outline shaping surface in one position wherein two sides of said quadrilateral shape are aligned substantially parallel to said runners and into another position wherein said two sides of said quadrilateral shape are angularly disposed with respect to said runners.

3. Apparatus for bending glass sheets comprising a support frame, a bending mold, a bearing plate attached to said support frame, a bearing plate attached to said bending mold, said bending mold having a shaping surface extending generally parallel to the planes of said bearing plates and pivot means located below said mold and within an area subtended by the perimeter of said shaping surface and extending at an angle to said bearing plates to permit said bending mold to pivot with respect to said support frame.

4. Apparatus for bending glass sheets comprising a mold having an upper shaping surface into which a flat glass sheet is sagged into contact by exposure to heat, said upper shaping surface lying in a substantially horizontal plane, a mold support frame disposed in a substantially horizontal plane beneath said mold, and pivot means located below said mold and within an area subtended by the perimeter of said shaping surface for pivotally connecting said mold to said mold support frame for pivoting the former with respect to the latter about an axis extending substantially vertically.

References Cited by the Examiner
UNITED STATES PATENTS

| | | | |
|---|---|---|---|
| 1,489,729 | 4/1924 | Acremanne | 65—273 |
| 2,261,023 | 10/1941 | Galey | 65—107 |

DONALL H. SYLVESTER, *Primary Examiner.*

A. D. KELLOGG, *Assistant Examiner.*